US007693550B2

(12) United States Patent
Lobinger et al.

(10) Patent No.: US 7,693,550 B2
(45) Date of Patent: Apr. 6, 2010

(54) METHOD FOR THE TRANSMISSION OF A GLOBAL PILOT SIGNAL BETWEEN STATIONS OF A RADIO COMMUNICATION SYSTEM AND STATION FOR THE ABOVE

(75) Inventors: Andreas Lobinger, Miesbach (DE); Bernhard Raaf, Neuried (DE); Alexander Seeger, Feldkirchen (DE); Ralf Wiedmann, München (DE)

(73) Assignee: Siemens Aktiengesellschaft, Munich (DE)

( * ) Notice: Subject to any disclaimer, the term of this patent is extended or adjusted under 35 U.S.C. 154(b) by 1102 days.

(21) Appl. No.: 10/487,027

(22) PCT Filed: Aug. 1, 2002

(86) PCT No.: PCT/DE02/02847

§ 371 (c)(1),
(2), (4) Date: Feb. 17, 2004

(87) PCT Pub. No.: WO03/019815

PCT Pub. Date: Mar. 6, 2003

(65) Prior Publication Data

US 2004/0233872 A1 Nov. 25, 2004

(30) Foreign Application Priority Data

Aug. 17, 2001 (DE) ................................ 101 40 532

(51) Int. Cl.
*H04W 24/00* (2009.01)
*H04W 4/00* (2009.01)

(52) U.S. Cl. .................................... 455/562.1; 370/334

(58) Field of Classification Search ................. 370/334; 455/562.1
See application file for complete search history.

(56) References Cited

U.S. PATENT DOCUMENTS

| | | | | |
|---|---|---|---|---|
| 5,966,670 | A | 10/1999 | Jolma et al. | |
| 6,131,016 | A | 10/2000 | Sollenberger et al. | |
| 6,636,495 | B1 * | 10/2003 | Tangemann | 370/334 |
| 6,690,712 | B2 * | 2/2004 | Kim et al. | 375/146 |
| 2003/0016637 | A1 * | 1/2003 | Khayrallah et al. | 370/329 |

FOREIGN PATENT DOCUMENTS

| | | |
|---|---|---|
| EP | 1 054 519 | 11/2000 |
| WO | WO 03019815 A1 | 3/2003 |

* cited by examiner

*Primary Examiner*—Vincent P Harper
*Assistant Examiner*—Marivelisse Santiago-Cordero
(74) *Attorney, Agent, or Firm*—King & Spalding, L.L.P.

(57) ABSTRACT

The invention relates to a method for the transmission of a global pilot signal from a base station of a radio communication system to a user station and a base station suitable for carrying out the above method. The base station comprises a number of antennae each with a characteristic pilot bit sequence. The global pilot signal is generated by overlaying the pilot bit sequences emitted from the several antennae of the base station, whereby the following method steps are carried out: a) division of the several antennae into a first group and a second group each with at least one antenna, b) transmission of the pilot bit sequences of the antennae of just the first group and c) modification of the compositions of the first and second group and return to step b).

14 Claims, 5 Drawing Sheets

Figure 1:
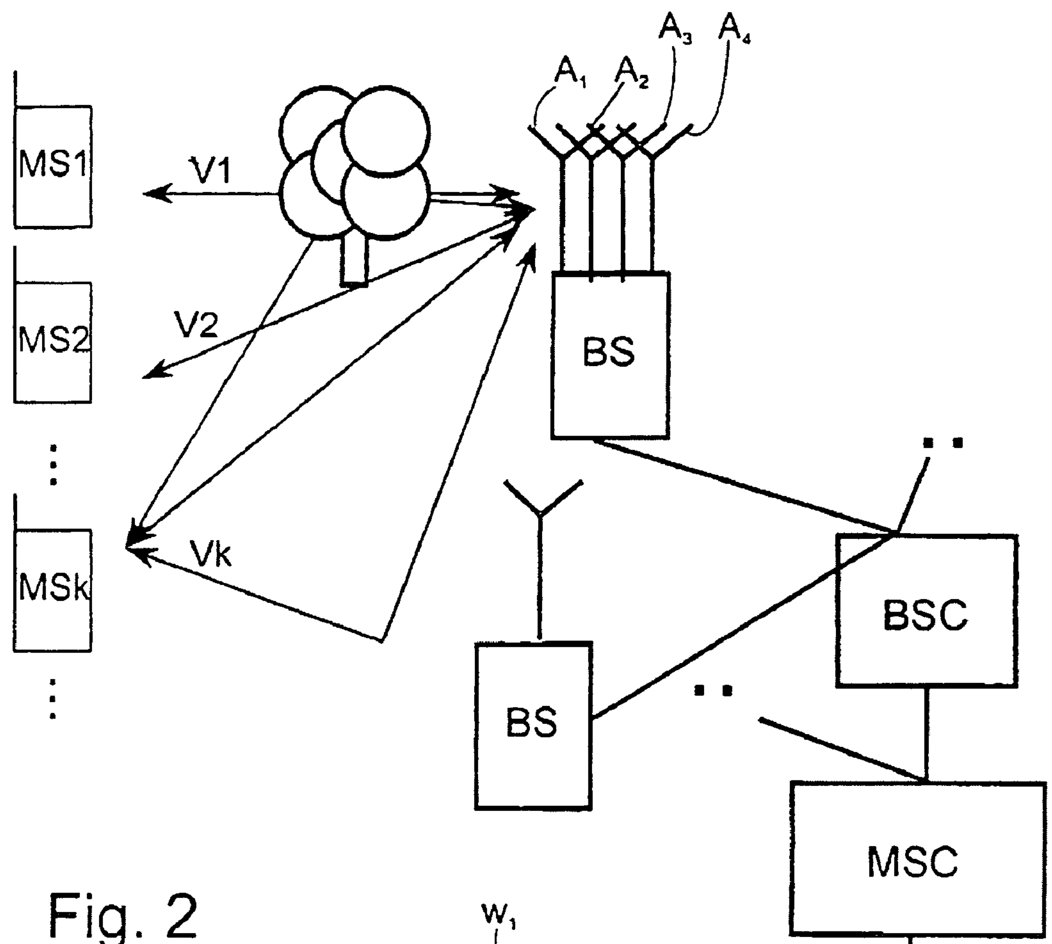

METHOD FOR THE TRANSMISSION OF A GLOBAL PILOT SIGNAL BETWEEN STATIONS OF A RADIO COMMUNICATION SYSTEM AND STATION FOR THE ABOVE

CLAIM FOR PRIORITY

This application is a national stage application of PCT/DE02/02847, filed Aug. 1, 2002, which claims the benefit of priority to German Application No. 101 40 532.4, filed Aug. 17, 2001, the contents of which hereby incorporated by reference.

The invention relates to a method for the transmission of a global pilot signal from a first station of a radio communication system to a second station, with the first station having a number of antennas, to each of which a characteristic pilot bit sequence is assigned, whereby with the method the global pilot signal is generated by overlaying the pilot bit sequence emitted from the several antennas of the first station, as well as a station suitable for emitting this global pilot signal.

In a mobile radio communication system such as the UMTS system, several antennas, at present two antennas, are used at one base station to utilize the spatial diversity. These are weighted with different weighting factors for data transmission on dedicated channels to individual user stations. The weighting factors are generally complex numbers, consisting of an amount component and a phase component. A set of weighting factors used simultaneously for a dedicated channel is also known as a weighting vector. The weighting factors are chosen in each case so that a radiation lobe in the direction of its location results from the weighting for each user station in a cell (beam shaping).

With the Closed-Loop Transmit Diversity method, as it is called, the user station informs the base station, by feedback information in the uplink, how it should specify the weighting factors, so that optimum reception is achieved at the user station with a corresponding transmission power at the base station. To be able to supply this feedback information, the user station must have estimates of the attenuation and phase shift on the signal propagation paths from the various antennas of the base station to the user station. These estimates are normally obtained in the UMTS system by using a global pilot signal that is transmitted from the base station to all user stations in one cell of the base station. The global pilot system is an overlay of pilot bit sequences of the individual antennas of the base station, with the pilot bit sequence varying from antenna to antenna and being characteristic in each case of the transmitting antenna. Because these pilot bit sequences are permanently specified and therefore "known" to the user station, the user station is able to extract the pilot bit sequences from the downlink signal and separate them from each other, in order to estimate the channel properties such as attenuation and phase shift for each individual antenna.

To be able to service as many user stations as possible at the same time from a radio cell of a communication system supplied from a base station, it is desirable to be able to direct the radiation of a downlink signal meant for a given user station as precisely and concentratedly as possible to this user station. This requires a greater number of antennas at the base station than the two at present normally used.

If the number of antennas is increased, this leads to the problem that all these antennas must radiate a pilot bit sequence that is characteristic of them, so that the use station can make channel estimates for these antennas. Because the pilot bit transmission power of the individual antennas cannot be reduced without impairment of the quality of the channel estimation for user stations far from the last station, the total transmission power of the global pilot signal in such cases must be increased proportional to the number of antennas. However, this leads to increased interferences and in turn limits the number of user stations that can be supplied simultaneously.

The object of this invention is to provide a method for the transmission of a global pilot signal that enables all user stations located in the radio cell of a given base station to supply a global pilot signal that enables a channel estimate of adequate quality, without the transmission power of the global pilot signal necessary for this having to be increased proportional to the number of antennas.

The object is achieved in that the several antennas of the base station are divided into a first group and a second group, each with at least one antenna, that at a given time only the pilot bit sequence is transmitted that belongs to the antennas of the first group and that the compositions of the first and of the second group can be changed from time to time.

This enables each pilot bit sequence to be transmitted at the power necessary to enable a channel estimate for this pilot signal sequence to be performed in the complete area of the radio cell of the base station, but because not all the antennas transmit their pilot bit sequence at the same time, the power of the global pilot signal remains less than n-times the transmission power of the pilot bit sequence, with n being the number of antennas. Although each pilot bit signal is not available for measurement at each time point, a suitable control of the composition of the two groups, or sufficiently frequent changing of the composition, can ensure that an adequate current channel estimation is possible for all antennas.

Preferably, the compositions of the groups repeat cyclically. This enables the user stations to "know" in advance, from their "knowledge" of the preset cycle, from which pilot bit sequences of the individual antennas the global pilot signal is composed at a given time point, without a check being required to identify this pilot bit sequence in the received global pilot signal.

In a simple arrangement of the method, it is provided that in each cycle each antenna belongs at least once to the second group, i.e. at least for a given time period it does not transmit its pilot bit sequence. This equal treatment of all antennas enables simple control.

According to a preferred embodiment, two antennas belong permanently to the first group. The advantage of this arrangement is that it is suitable as a development of the existing UMTS standard. This in fact provides that the global pilot signal permanently contains the pilot bit sequence of the two antennas hitherto provided, and user stations designed for this standard require the permanent presence of the pilot bit sequence of these two antennas in the global pilot signal in order to operate correctly.

A third and a fourth antenna of the base station (or if necessary further antennas) belong in each case alternately to the first or second group, i.e. their pilot bit sequences are not permanently transmitted.

If the basis station has a total of four antennas, the third and fourth antennas are preferably assigned alternately to the first and second groups, i.e. in a first time period, the global pilot signal consists of the pilot bit sequences of the first, second and third antennas, in a second time period it consists of that of the first, second and fourth antennas and in a third time period it again consists of that of the first, second and third antennas.

The time points at which the composition of the two groups is changed depends appropriately on the time structure of the transmitted signal of the base station. In the UMTS system and in many other mobile radio communication systems, this transmitted signal is divided into frames and the frames are in turn divided into a number of time slots.

In a first preferred embodiment therefore, the composition of the two groups takes place in each case at a boundary between two time slots. This change can take place at every boundary between two time slots. For a system with fifteen time slots per frame and four antennas, of which the first and second permanently, and the third and fourth alternately in each case, belong to the first group, the result is that the composition of the global pilot signal in time slots with the same serial number is different from the start of a frame for successive frames and repeats only from one frame to the next but one.

It can also be provided that the cycle in which the various compositions of the global pilot signal repeat is one frame in each case. This simplifies the evaluation of the global pilot signal by the user station because the user station does not have to take into account a serial number of the current frame to achieve a correct assignment of the channel estimates to the individual antennas of the base station.

In the special case, considered above, of a system with four antennas, of which the first and second permanently and the third and fourth alternately, in each case, belong to the first group, this can be realized in that the composition of the first group is changed between two time slots of an identical frame and remains unchanged from a last time slot of a frame to the first time slot of the succeeding frame.

A further possibility with such a system with four antennas is that in a first time slot the first, second and third antennas belong to the first group, and in a succeeding second time slot after that the first, second and fourth antennas, and in a succeeding third time slot only the first and second antennas. This cycle of three time slots can be repeated five times in a frame of fifteen time slots and the sequence of the composition is the same from frame to frame.

Whereas a change in the composition of the groups associated with time slot boundaries can be used in radio communication systems based on code-division multiplexing and on time-division multiplexing, code-division multiplexing systems such as the UMTS are also suitable for changing the composition of the group that is not linked to time slot boundaries. Code-division multiplexing systems enable the global pilot system to be radiated continuously over time, so that a channel estimate is possible at any time point if required by the user station. The change in the composition can therefore also take place in time periods of M/m-times the duration of a time slot in each case, with m being a natural number, preferably 2M, M or 2M/3 and M the number of time slots of a frame, in the case of the UMTS system this is 15.

The method described above can be suitably used for the transmission of a global pilot signal as part of a closed loop transmit diversity method, in which, for beam shaping of a signal sent by the base station to a user station, the base station specifies a weighting factor for beam shaping for each antenna on the basis of the feedback information sent by the user station. The following steps are periodically repeated for this purpose.

Performance of a channel estimation by the second station for at least one current pilot bit sequence contained in the global pilot signal in each case.

Derivation of feedback information, relating to the pilot bit sequence thus estimated, from the channel estimation and transmission of the feedback information to the first station.

Using the feedback information to update one of the weighting factors assigned to the estimated pilot bit sequence.

To achieve beam shaping as close as possible to real time, the steps of the derivation of the feedback information and of the updating of the weighting factor are each carried out at a fixed time interval, and in each updating step the weighting factor for which feedback information has just been derived and transmitted is updated.

To minimize the amount of feedback information to be transmitted, one antenna of the base station can be selected, whose assigned weighting factor is assumed to be a constant reference factor. In this case, at least one channel estimation can be carried out on a pilot bit sequence of a different antenna and feedback information derived from this channel estimation transmitted to the base station. In this case, it is sufficient for a complete updating of the weighting factors at a base station with n antennas to transmit the feedback information n-1 times.

The saving of transmitted feedback information achieved in this way reduces in proportion to the number n of antennas. There is also the fact that when the phase shift on the channel of the first antenna assumed as a reference changes and remains the same on the channels of the other antennas, matching of all of the weighting factors used by the base station to this change is possible only by changing the phases of all the other weighting factors, i.e. the matching requires the feedback information to be transmitted n-1 times and is therefore very sluggish. To avoid these disadvantages, a method is proposed whereby a sliding average value of the weighting factors is calculated as the reference factor, the channel estimations are carried out on the pilot bit sequences of all antennas and the feedback information includes at least one piece of phase information as a function of the evaluated pilot bit sequence with respect to the reference factor. This method enables the weighting factor to be matched to each individual antenna at the same speed.

To calculate the sliding actual value for the pilot bit sequence of the jth antenna, a sum in the form $$\sum_i w_i h_i$$

is preferably formed, with $w_i$ being a weighting factor, $h_i$ a channel estimation of the pilot bit sequence of the i-th antenna and $i \neq j$. This sum can be formed for all antennas of the first station with the exception of the jth antenna; in this case the channel estimations $h_i$ obtained at an earlier time point must be used at least for the antennas i that belonged to the second group at the time point of the calculation of the average value calculation. A further possibility is to extend this summation to all the antennas of the first group with the exception of the jth. In this case all the pilot bit sequences the channel estimations of which are included in the average valve are available at the time point of the calculation, so that current evaluations can also be used for these pilot bit sequences.

In addition to phase information, the feedback information can also include field strength information relative to the reception field strength of the evaluated pilot bit sequence, in order thus to control not only the phase with which a specific antenna transmits but also its power.

Further features and advantages of the invention are given in the following description of exemplary embodiments with reference to the included illustrations. These are as follows:

FIG. 1 A block diagram of a radio communication system in which the present invention can be used.

Figure 2:
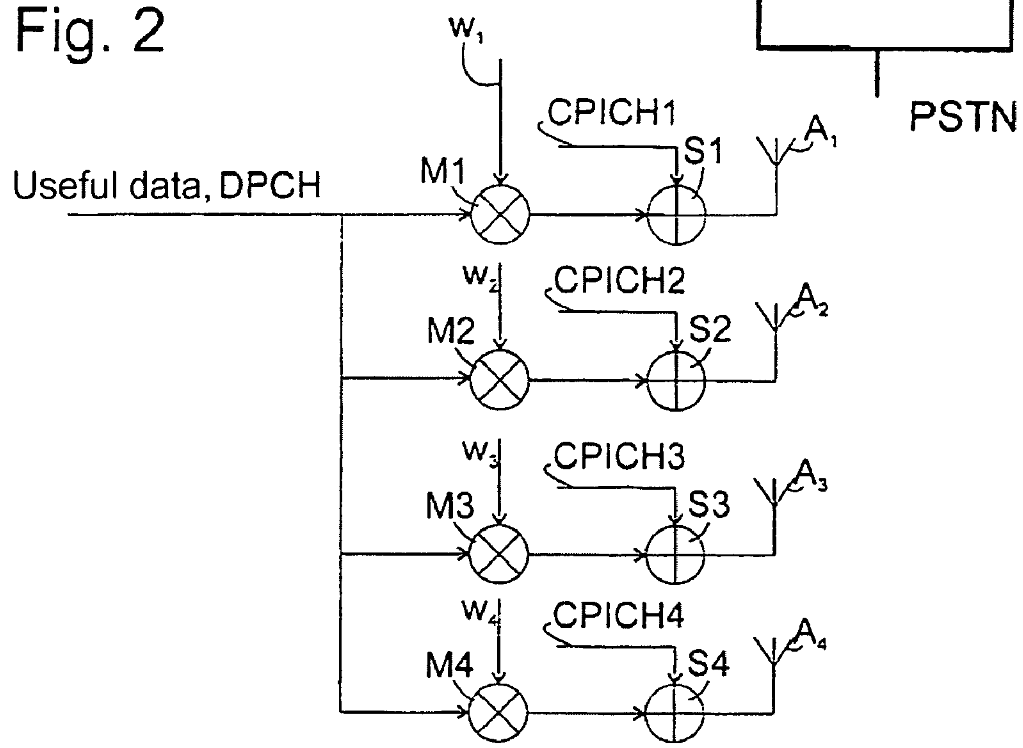

FIG. 2 A block diagram of the transmitter stage of a base station of the radio communication system from FIG. 1.

Figure 3:
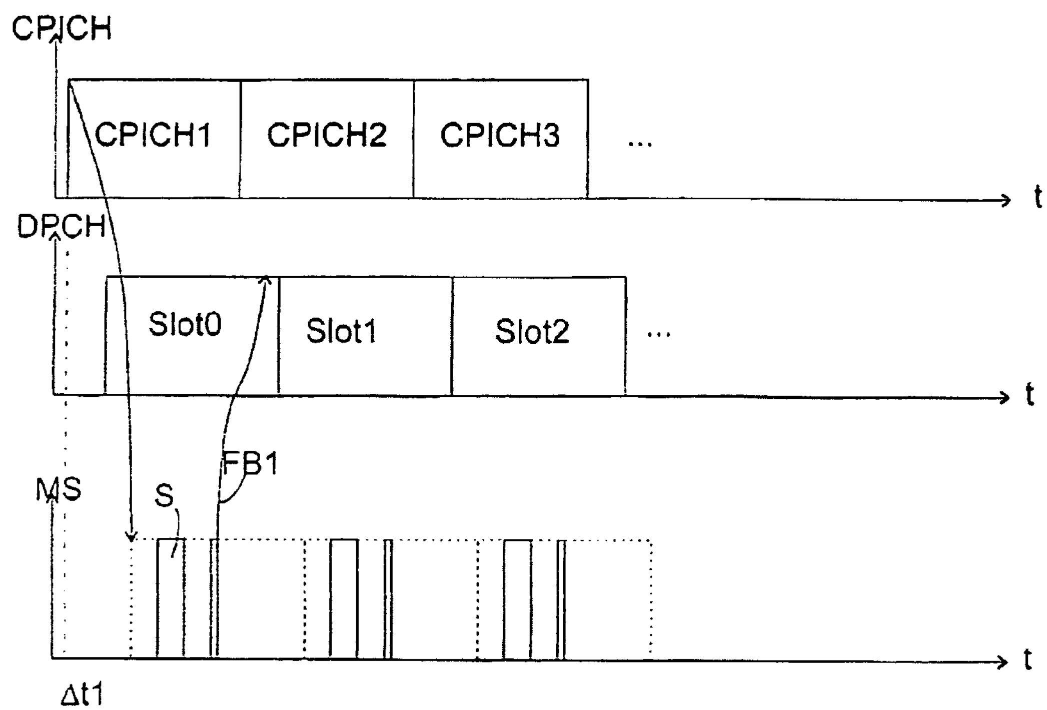
Figure 3A:
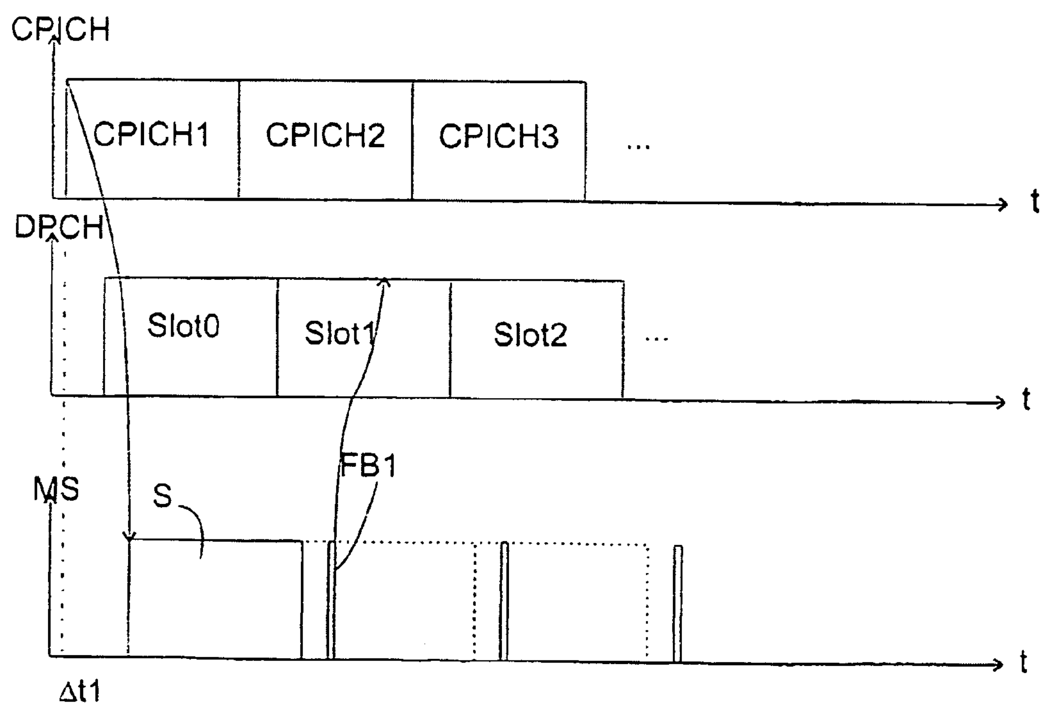

FIGS. 3 and 3A Each is a time-characteristic diagram showing the time relationship between the individual pilot bit sequences of the global pilot signal, a downlink data channel and an uplink data channel.

FIG. 4 to 8 Examples of the changing composition of the global pilot system relative to time, according to the various configurations of the invention.

FIG. 1 shows the structure of a radio communication system in which this invention can be used. It consists of a number of mobile switching centers MSC, that are networked with each other and/or provide access to a fixed network PSTN. Furthermore, these mobile switching centers MSC are each connected to at least one base station control BSC. Each base station controller BSC in turn enables a connection to at least one base station BS. Such a base station BS can establish a communication link to a user station MS through a radio interface. It is fitted with an antenna installation that has several antennas, in this case four antennas $A_1$, $A_2$, $A_3$, $A_4$. These antennas $A_1$ to $A_4$ are supplied with a downlink signal from the base station BS, composed of several components. One of these components is a global pilot signal CPICH (Common Pilot Channel) that consists of several pilot bit sequences CPICH1, CPICH2, CPICH3 and CPICH4 of antennas $A_1$ to $A_4$. Another group of components is dedicated data channels DPCH (Dedicated Physical Channel) on which useful data meant for a user station MS is transmitted.

FIG. 2 is a schematic representation of the transmitter stage of the base station BS from FIG. 1. As this illustration shows, the symbols of the useful data channel DPCH are multiplied in the transmitter stage by multipliers M1 to M4 by complex weighting factors $w_1$, $w_2$, $w_3$, $w_4$. In this way, a phase shift and an amplitude state are impressed on the useful data channel emitted from the antennas, thus leading to a directed propagation of the data channel DPCH on the radio path.

The output signals of multipliers M1, M2, M3, M4 each pass through an adder S1, S2, S3, S4, through which the pilot bit sequence CPICH1, CPICH2, CPICH3, CPICH4 of the global pilot signal CPICH of antennas $A_1$ to $A_4$ can be passed. The pilot bit sequences CPICH1 to CPICH4 are orthogonal relative to each other and propagate undirected in the radio cell. Because they should be able to be received by all user stations in the radio cell, they are emitted at a fixed power that is generally higher than that of the useful data channel.

The pilot bit sequences are orthogonal relative to each other and each is characteristic of an antenna to which it is assigned. The orthogonality enables the user stations MS1, MS2, . . . , MSk . . . , to separate the components of the different pilot bit sequences in a received signal and to carry a channel estimation separately for each of these sequences, i.e. for each of antennas $A_1$ to $A_4$. The manner in which such an evaluation is carried out is known and need not be dealt with in detail here. It provides data on the attenuation and phase shift on the transmission channel from the assigned antenna to the user station.

A particular feature of the base station BS is that not all the pilot bit sequences are added to the transmitted signal at the same time. Instead, the base station BS cyclically divides the antennas or the pilot bit sequences assigned to them into a first and second group and adds only the pilot bit sequences of the first group to the transmitted signal. Examples of this arrangement are explained in the following.

EXEMPLARY EMBODIMENT 1

The transmitted signal of the base station is divided into frames that are in turn subdivided into fifteen time slots each. The composition of the first and second groups is changed from one time slot to the next. The association of a pilot bit sequence to the first or second group is shown in the following table 1.

| Time slot | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Feedback to | $w_4$ | $w_1$ | $w_2$ | $w_3$ | $w_4$ | $w_1$ | $w_2$ | $w_3$ | $w_4$ | $w_1$ | $w_2$ | $w_3$ | $w_4$ | $w_1$ | $w_2$ |
| CPICH1 | X | | | | X | | | | X | | | | X | | |
| CPICH2 | | X | | | | X | | | | X | | | | X | |
| CPICH3 | | | X | | | | X | | | | X | | | | X |
| CPICH4 | | | | X | | | | X | | | | X | | | |

An x at the intersection of a line corresponding to a pilot bit sequence with a column corresponding to a time slot indicates that the pilot bit sequence in this time slot belongs to the first group, while an empty box indicates that the pilot bit sequence belongs to the second group. As can be seen, the global pilot signal contains only one pilot bit sequence in each time slot, while the individual pilot bit sequences CPICH1 to CPICH4 alternate cyclically in time slots 0 to 14.

Alternatively, it can be provided that the cyclical change also takes place overlapping from one frame to the next. In this case, a time slot 0 of a succeeding frame in which the global pilot signal consists only of CPICH4 would follow on the time slot 14 of the table shown here.

In any case it is preferred that the sequence of the compositions of the first and second groups repeats identically in each case in succeeding frames. This enables a user station to decide, by just using the number of a time slot without taking into account the number of the frame, which pilot bit sequence (or sequences) is contained in the global pilot signal.

In each time slot, the user station obtains a channel estimation $h_j$ for the pilot bit sequence CPICHj transmitted in this time slot. Channel estimations $h_i$, i≠j for other pilot bit sequences and also weighting factors $w_i$ selected by the user stations for these pilot bit sequences are known from earlier time slots. The user station now selects a weighting factor $w_j$ for the estimated pilot bit sequence CPICHj so the phase of the product of $w_j h_j$ is equal to the phase of $$\sum_{\substack{i \\ i \neq j}} w_i h_i$$

and that the square sum of the weighting factors of all antennas $$\sum_{i=1}^{n} |w_i^2|$$

remains equal to 1. The weighting factors are calculated according to the following formula $$w_j = h_j^* \cdot \frac{\sum_{i \neq j} w_i h_i}{(n-1)|h_j|^2} \tag{1}$$

In this case $h_j$* represents the complex number conjugated to $h_j$. The weighting factor $w_j$ obtained in this way is transmitted as feedback information to the base station in the succeeding time slot.

The weighting factors calculated according to formula (1) have both a variable amount and a variable phase. For simplification, particularly to reduce the amount of feedback information to be transmitted, the amount of all weighting factors can be assumed to be constant and only the phase variable. With these variants, the weighting factors are calculated according to the following formula $$e^{\hat{j}\phi_j} = K h_j^* \sum_{i \neq j} e^{\hat{j}\phi_i} h_i \tag{2}$$

where ĵ is the imaginary number, K is a standardization factor and $\phi_i$, $\phi_j$, represents the phase of $w_i$ or $w_j$ in each case.

The base station BS updates the set of weighting factors used by it for beam shaping in each time slot.

FIG. 3 shows the progress of these processes in detail over the course of three time slots. The pilot bit sequence CPICH1 emitted in a first time slot of the global pilot signal CPICH reaches the user station MS after a transit time Δt1. While the pilot bit sequence CPICH1 is available at the user station MS, this carries out a channel estimation S, processes this and transmits the feedback information FB1 derived from it back to the base station BS. There, the feedback information FB1 arrives just before the start of a time slot of the downlink signal. Using the feedback information FB1, the base station updates the weighting factor $w_1$ assigned to the antenna $A_1$ that CPICH1 has sent. The time slot Slot1 of the downlink signal is transmitted with the updated set of weighting vectors. This is repeated accordingly in the succeeding time slots for antennas $A_2$, $A_3$ and their pilot bit sequences CPICH2, CPICH3.

As FIG. 3A shows, the channel estimation S can also take up the same time period in which the user station MS receives the pilot bit sequence CPICH1. The extended duration of the estimation enables high accuracy, but the feedback information FB1 is also available later than in the case of the example in FIG. 3. It does not reach the base station BS until during time slot Slot1 and can therefore not be considered for beam shaping until time slot Slot2.

The line marked "Feedback to" in Table 1 shows, for each time slot, the weighting factor for which the user station supplies feedback information in this time slot. This is always the weighting factor whose pilot bit sequence was formed in the proceeding time slot by the pilot signal.

EXEMPLARY EMBODIMENT 2

In exemplary embodiment 1, the global pilot signal CPICH1 contains only a single pilot bit sequence at each time point. This is fewer than provided according to the present standard for the UMTS system with two antennas, where the global pilot signal in each case contains the pilot bit sequences of both antennas. The global pilot signal could thus also contain two pilot bit sequences with the method in accordance with the invention, without this requiring an increase in the transmission power of the global pilot signal compared to the applicable UMTS standard. According to the second exemplary embodiment of the method in accordance with the invention, the pilot bit sequences CPICH1 to CPICH4 are therefore assigned to the first and second group in accordance with the following Table 2.

TABLE 2

| Time slot | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Feedback to | $w_4$ | $w_1$ | $w_2$ | $w_3$ | $w_4$ | $w_1$ | $w_2$ | $w_3$ | $w_4$ | $w_1$ | $w_2$ | $w_3$ | $w_4$ | $w_1$ | $w_2$ |
| CPICH1 | X | | X | | X | | X | | X | | X | | X | | X |
| CPICH2 | | X | | X | | X | | X | | X | | X | | X | |
| CPICH3 | X | | X | | X | | X | | X | | X | | X | | X |
| CPICH4 | | X | | X | | X | | X | | X | | X | | X | |

This enables, for example in time slot 0, not only a channel estimation for CPICH1 to be carried out as in accordance with Table 1, but instead at the same time also for CPICH3, and thus the weighting factor $w_1$ for CPICH3 to be determined using a channel estimation $h_3$ performed in the same time slot, whereas with the method in accordance with Table 1, the determination of a weighting factor must sometimes be based on channel estimations that are several time slots old.

EXEMPLARY EMBODIMENT 3

As already mentioned, the applicable UMTS standard provides for base stations with two antennas. The pilot bit sequences of both these antennas are transmitted in each time slot of the global pilot signal. To guarantee compatibility of the method in accordance with the invention with the UMTS standard, it is therefore necessary that also in this case the pilot bit sequences of two antennas, in this case pilot bit sequences CPICH1, CPICH2 of antennas $A_1$, $A_2$, be permanently contained in the global pilot signal. In other words, these two pilot bit sequences must always be contained in the first group. The pilot bit sequences of the third and fourth antennas $A_3$, $A_4$ are merely added time slot by time slot, as shown in the following Table 3.

TABLE 3

| Time slot | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Feedback to | $w_2$ | $w_3$ | $w_4$ | $w_2$ | $w_3$ | $w_4$ | $w_2$ | $w_3$ | $w_4$ | $w_2$ | $w_3$ | $w_4$ | $w_2$ | $w_3$ | $w_4$ |
| CPICH1 | X | X | X | X | X | X | X | X | X | X | X | X | X | X | X |
| CPICH2 | X | X | X | X | X | X | X | X | X | X | X | X | X | X | X |
| CPICH3 | X | | | X | | | X | | | X | | | X | | |
| CPICH4 | | X | | | X | | | X | | | X | | | X | |

The compositions of the first and second groups repeat with one period of three time slots, with the pilot bit sequences of antennas $A_1$, $A_2$, $A_3$, being transmitted in one of the three time slots, those of antennas $A_1$, $A_2$, $A_4$ in another one and only those of antennas $A_1$, $A_2$ in a third.

The weighting factor $w_1$ on antenna $A_1$ is a real constant in this exemplary embodiment, e.g. $1/\sqrt{n}=1/2$ if n=4 is the number of antennas. No feedback information need be transmitted for this weighting factor. In time slot 0, in which the global pilot signal contains the pilot bit sequences CPICH1, CPICH2, CPICH3 of antennas $A_1$, $A_2$, $A_3$, the user station MS determines the channel estimates $h_1$, $h_2$, $h_3$ for these three pilot bit sequences and from this determines the weighting factor $w_3$, that maximizes the expression $$\left|\sum_i w_i h_i\right|^2$$

under the parameter of a constant transmission power of the useful data channel DPCH. This weighting factor $w_3$ is transmitted at the start of succeeding time slot 1 to the base station BS and is used in this time slot for beam shaping of the useful data channel DPCH.

In time slot 1 the global pilot signal contains the pilot bit sequences CPICH1, CPICH2, CPICH4 of antennas $A_1$, $A_2$, $A_4$. Here, the value of the weighting factor $w_4$ is updated in the same way, transmitted to the base station BS and the new value of $w_4$ is used for beam shaping in time slot 2. In time slot 2, in which the global pilot signal contains only the pilot bit sequences CPICH1, CPICH2, an updated weighting factor $w_2$ that is then transmitted is determined.

EXEMPLARY EMBODIMENT 4

The assignment of the individual pilot bit sequences CPICH1 to CPICH4 to the first or second group is shown in the following Table 4 and FIG. 4. CPICH1 and CPICH2 always, and CPICH3 and CPICH4 alternately, belong to the first group. The first group therefore always contains three elements. If the weighting factor $w_1$ is held constant, the sequence of updating of individual weighting factors shown in the table results.

TABLE 4

| Time slot | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Feedback to | $w_2$ | $w_3$ | $w_4$ | $w_2$ | $w_4$ | $w_3$ | $w_2$ | $w_3$ | $w_4$ | $w_2$ | $w_4$ | $w_3$ | $w_2$ | $w_3$ | $w_4$ |
| CPICH1 | X | X | X | X | X | X | X | X | X | X | X | X | X | X | X |
| CPICH2 | X | X | X | X | X | X | X | X | X | X | X | X | X | X | X |
| CPICH3 | X | | X | | X | | X | | X | | X | | X | | X |
| CPICH4 | | X | | X | | X | | X | | X | | X | | X | |

Figure 4:
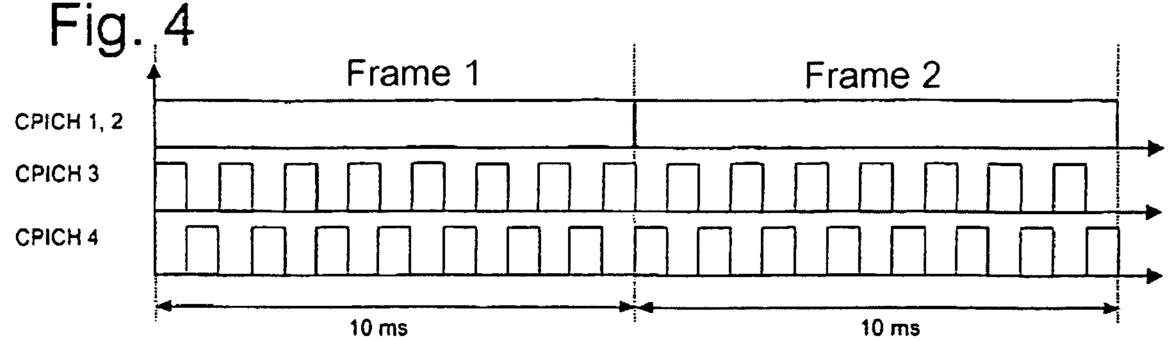

As FIG. 4 shows, the pilot bit sequences CPICH3 and CPICH4 can be strictly transmitted alternately from one time slot to the next. In this case, two different frame types occur, one in which CPICH3 is transmitted in its first time slot and one in which CPICH4 is transmitted in its first time slot.

It can also be provided that the composition of the groups repeats exactly from frame to frame. In this case, shown in FIG. 5, the composition of the groups remains unchanged at the transition from time slot 14 of a frame to time slot 0 of the succeeding one.

EXEMPLARY EMBODIMENT 5

Figure 5:
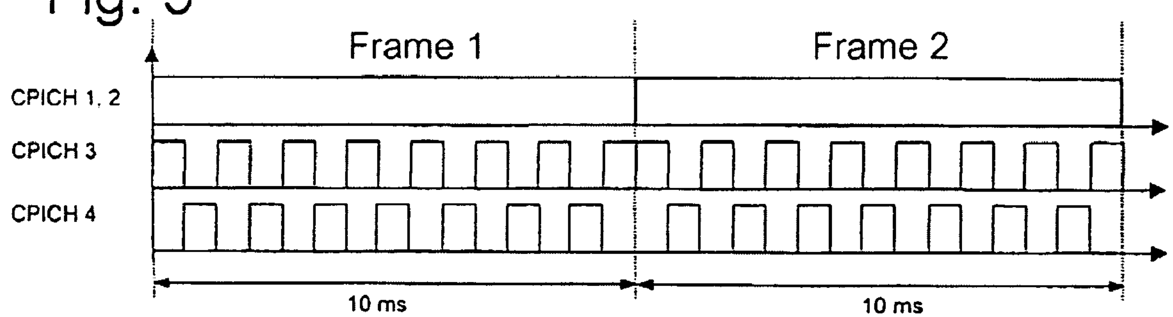

The assignment of pilot bit sequences CPICH1 to CPICH4, as shown in FIG. 5, is suitable for a method where none of the weighting factors is assumed to be constant, but instead, as already stated with reference to the exemplary embodiments 1 and 2, the transmitted feedback information gives an amplitude and phase of the weighting factor of each individual antenna relative to an averaged weighting factor and is calculated in accordance with formula (1) or (2). A possible sequence in which the feedback information relative to the individual antenna can be transmitted is shown in the following Table 5. In this case also, the transmission sequence is specified so that the feedback information transmitted at the start of each of the time slots is based on a calculation of the weighting factor carried out in an immediately proceeding time slot.

TABLE 5

| Slot | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Feedback to | $w_2$ | $w_3$ | $w_4$ | $w_1$ | $w_2$ | $w_3$ | $w_4$ | $w_1$ | $w_2$ | $w_3$ | $w_4$ | $w_1$ | $w_2$ | $w_3$ | $w_4$ |
| CPICH1 | X | X | X | X | X | X | X | X | X | X | X | X | X | X | X |
| CPICH2 | X | X | X | X | X | X | X | X | X | X | X | X | X | X | X |
| CPICH3 | X | | X | | X | | X | | X | | X | | X | | X |
| CPICH4 | | X | | X | | X | | X | | X | | X | | X | |

Whereas in formulas (1) and (2) the summation extends over all pilot bit sequences CPICHi that are different from the sequence CPICHj for which the new weighting factor $w_j$ is calculated in each case, according to a variation of this exemplary embodiment the summation can also be limited to only those pilot bit sequences CPICHi that are contained in the global pilot signal during the time slot in which the weighting factor $w_j$ is determined and are different from CPICHj. This enables all variables that are included in the calculation of the weighting factor $w_j$ to be based on the measurements carried out in the same time slot, i.e. enables them to have the maximum possible currency. The following expression then results for the updated weighting factor:

$$w_j = h_j^* \cdot \frac{\sum_{\substack{i \neq j \\ i \in Group I}} w_i h_i}{(\#(Group\, I) - 1)|h_j|^2} \tag{3}$$

whereby #(group1) indicates the number of antennas of the first group, or in this case that only the phases of the weighting factors are varied, $$e^{\hat{j}\phi_j} = K' h_j^* \cdot \sum_{\substack{i \neq j \\ i \in Group I}} e^{\hat{j}\phi_i} h_i \tag{4}$$

where K' is a standardization factor adapted taking account of the reduced number of summands compared to formula (2).

EXEMPLARY EMBODIMENT 6

Figure 6:
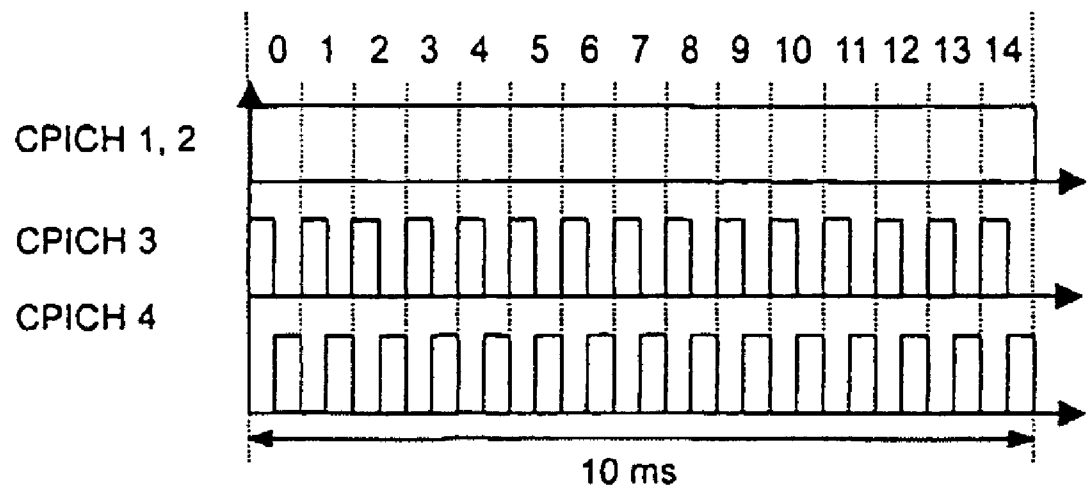

FIG. 6 shows a sixth example of the time pattern of the composition of the global pilot signal CPICH over the period of a frame with fifteen time slots, numbered 0 to 14. The pilot bit sequences CPICH1, CPICH2 are emitted in sequence, the pilot bit sequences CPICH3, CPICH4 are each emitted alternately over the duration of a half time slot, i.e. the composition of the first and second groups is changed twice per time slot or m=30 times per frame.

This enables a user station MS to obtain a current channel estimation $h_i$ for all pilot bit sequences CPICHi in each time slot, and thus a weighting factor $w_j$ that is to be supplied to the base station BS, as feedback information to be obtained using the channel estimations $h_i$, none of which is older than a single time slot. Because the distribution of the pilot bit sequences is the same in each time slot, feedback information for any weighting factor can be obtained in each time slot and transmitted to the base station. If the weighting factor $w_1$ is assumed to be constant, five cycles of three time slots can thus run in each frame, in which feedback information is transmitted once to each of the three other weighting factors $w_2$, $w_3$, $w_4$.

EXEMPLARY EMBODIMENT 7

Figure 7:
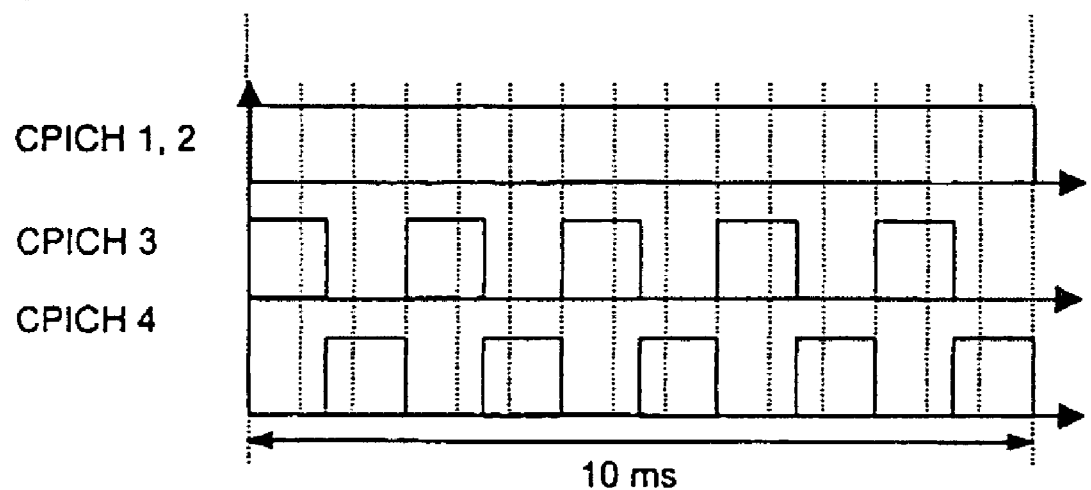

A seventh example of a time pattern of the composition of the global pilot signal is shown in FIG. 7. In this case also the pilot bit sequences CPICH1, CPICH2 of antennas $A_1$, $A_2$ are continuously transmitted and pilot bit sequences CPICH3, CPICH4 of antennas $A_3$, $A_4$ are transmitted alternately of course, the composition of the first and second group is changed only m=10 times per frame so that the composition of the global pilot signal remains unchanged over 1.5 time slots. In time slot 0, the user station MS receives the pilot bit sequences CPICH1, CPICH2, CPICH3 and can generate channel estimations for these. From this, it calculates a new weighting factor $w_3$ for antenna $A_3$ and in time slot 1 transmits feedback information relative to this weighting factor $w_3$ to the base station BS.

In course of time slot 1, the composition of the global pilot signal changes. Using the channel estimations obtained in this time slot, the user station calculates a new weighting factor $w_2$ for antenna $A_2$ and transmits feedback information referring to it in the succeeding time slot 2.

In time slot 2 the global pilot signal contains the pilot bit sequences CPICH1, CPICH2, CPICH4, so that channel estimations can be obtained for $A_1$, $A_2$, $A_4$. Feedback information for the weighting factor $w_4$ derived from this is transmitted to the base station in time slot 3. This sequence is repeated five times per frame, as summarized in the following table 6.

TABLE 6

| Slot | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Feedback to | $w_4$ | $w_3$ | $w_2$ | $w_4$ | $w_3$ | $w_2$ | $w_4$ | $w_3$ | $w_2$ | $w_4$ | $w_3$ | $w_2$ | $w_4$ | $w_3$ | $w_2$ |
| CPICH1 | X | X | X | X | X | X | X | X | X | X | X | X | X | X | X |
| CPICH2 | X | X | X | X | X | X | X | X | X | X | X | X | X | X | X |
| CPICH3 | X | ½ | | X | ½ | | X | ½ | | X | ½ | | X | ½ | |
| CPICH4 | | ½ | X | | ½ | X | | ½ | X | | ½ | X | | ½ | X |

Because the composition of the global pilot signal in this exemplary embodiment remains unchanged over relatively long time periods of more than one time slot, it is assumed that channel estimations are also possible with a good accuracy for $A_3$, $A_4$.

EXEMPLARY EMBODIMENT 8

In the UMTS system, it is provided that the base station BS is able to specify a time displacement $\tau_{DPCH}$ between useful data channel DPCH and the frame limit detectable by the pattern of the global pilot signal CPICH for the user stations. Conventionally, this time displacement $\tau_{DPCH}$ can have values of 0 to 149 symbol lengths, whereby a value of 0 would correspond to no time displacement between the network data channel and the frame limit and a value of 150 a time displacement of a complete frame length. The first time slot of the useful data channel DPCH can therefore have practically any time displacement in the downlink and in the uplink, with reference to the start of the corresponding frame of the global pilot signal CPICH.

In each uplink time slot, the base station BS expects feedback information on a specific weighting factor. In the following it is assumed for example that the expected sequence of the feedback information corresponds to the above Table 4, but it is apparent that a different sequence in accordance with any other table or yet another different sequence could be used as a basis. To be able to make the feedback information available at the right time, the user station MS must take into account the time displacement $\tau_{DPCH}$ when the feedback information is placed in the uplink frame of the useful data channel DPCH. It is apparent that a certain minimum time displacement of some symbols is necessary for the user station MS to be able to generate a channel estimation from the global pilot signal transmitted in a downlink time slot and derive feedback information. This feedback information must be transmitted at a specified time position of an uplink time slot, e.g. as the ninth of ten bits, in order to be able to be recognized by the base station as such. The time displacement is therefore appropriately chosen so that feedback information transmitted to the base station BS can be used there with the minimum delay for beam shaping of the next downlink time slot. To guarantee this, the choice of possible time displacements $\tau_{DPCH}$ is limited to values of the form p=10 k+9+d, whereby k can have any value from 0 to 14 and d indicates the time duration measured in symbols, that the user station MS requires to calculate the feedback information at the end of the measurement.

Figure 8:
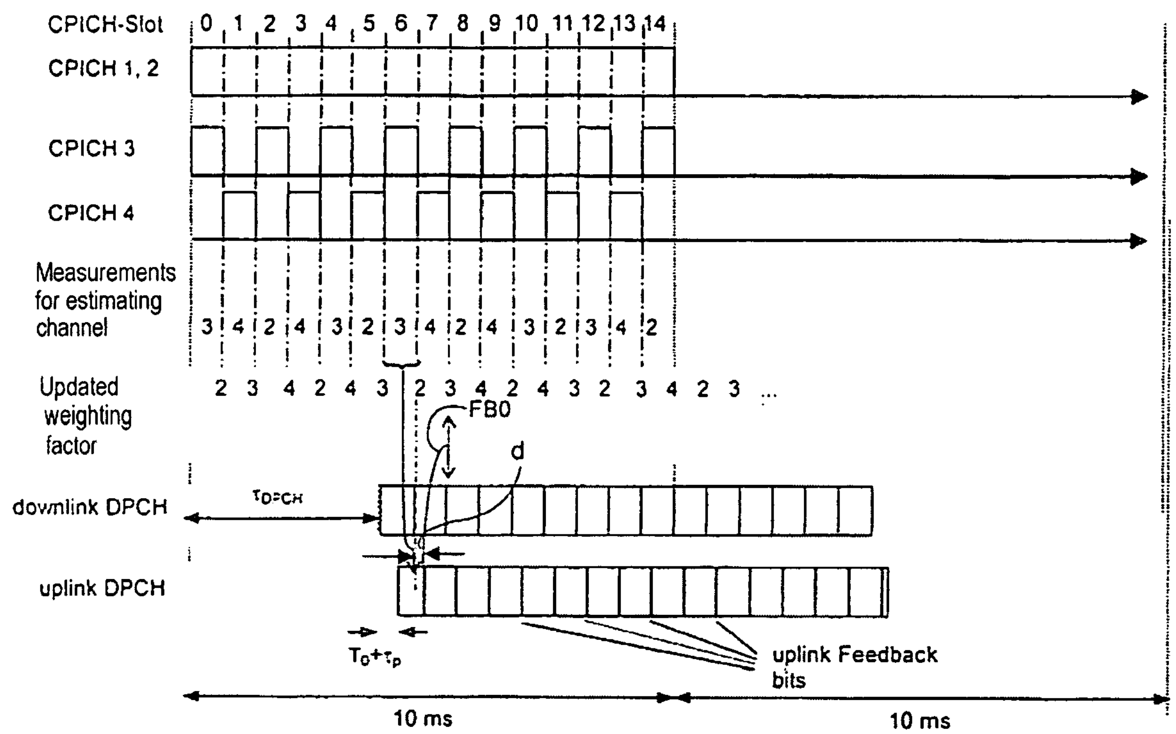

This is shown clearly by the time diagram FIG. 8. Lines CPICH1,2, CPICH3 and CPICH4 show the composition of the global pilot signal CPICH in the course of a frame, corresponding to table 4 or the first frames of FIGS. 4 and 5.

For example in CPICH time slot 7, the base station BS expects, from all the user stations supplied by it, feedback information for updating the weighting factor $w_3$, in order to take it into account for beam shaping from the start of time slot 8 of the CPICH channel. The number of the time slot of the uplink DPCH frame in which a user station transmits this feedback information depends on the value k of the time displacement assigned to the user station MS. The illustration shows the time position of the uplink and downlink DPCH frames where k=5. In this case, the user station MS must transmit feedback information FB0 for updating $w_3$ in time slot 0 of its uplink DPCH frame, so that it arrives at the correct time at the base station BS, taking account of the signal transit time $\tau_p$ between the stations, i.e. the user station MS takes the measurements necessary for this over the complete duration of the CPICH time slot 6 and calculates the FB0 from the results of the measurement in the time period d between the end of the measurements and the time point of the transmission of FB0. As can easily be seen from FIG. 8, the user station must supply feedback information for $w_4$, $w_2$, $w_4$, $w_3$, $w_2$, $w_3$ in the succeeding uplink time slots of its DPCH frame in turn (see also Table 7 under k=5).

In the case not illustrated in FIG. 8, where k=0, the downlink time slot 0 of the DPCH frame is delayed by p=9+d symbols with respect to the time slot 0 of the CPICH. If d=1, the delay amounts exactly to one time slot (because a time slot in the UMTS system contains 10 symbols). As can be seen from FIG. 8 in analogy with the k=5 case considered above the mobile station MS in this case carries out measurements in the downlink DPCH time slot 0 (simultaneous with CPICH time slot 1), from which it then obtains a channel estimation for $h_1$, $h_2$ and $h_4$ and from this calculates the feedback information for $w_4$. In the uplink DPCH time slot 0, it transmits the feedback information to the base station BS and this takes the information into account to transmit the downlink DPCH time slot 2 (simultaneous with CPICH time slot 3). As mentioned above, only the feedback information of one weighting factor $w_i$ can be transmitted per time slot.

Table 7 shows, for all values of k, the uplink DPCH time slot in which the feedback information is transmitted to the base station and the weighting factors $w_2$ to $w_4$ for which the particular feedback information is intended, if, as shown in FIG. 5, the composition of the first and second group repeats identically in each frame. A total of fifteen different sequences for the transmission of feedback information is obtained, produced by shifting apart by one element in each case.

TABLE 7

| Slot | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| k = 0 | $w_4$ | $w_2$ | $w_4$ | $w_3$ | $w_2$ | $w_3$ | $w_4$ | $w_2$ | $w_4$ | $w_3$ | $w_2$ | $w_3$ | $w_4$ | $w_2$ | $\mathbf{w}_3$ |
| k = 1 | $w_2$ | $w_4$ | $w_3$ | $w_2$ | $w_3$ | $w_4$ | $w_2$ | $w_4$ | $w_3$ | $w_2$ | $w_3$ | $w_4$ | $w_2$ | $\mathbf{w}_3$ | $w_4$ |
| k = 2 | $w_4$ | $w_3$ | $w_2$ | $w_3$ | $w_4$ | $w_2$ | $w_4$ | $w_3$ | $w_2$ | $w_3$ | $w_4$ | $w_2$ | $\mathbf{w}_3$ | $w_4$ | $w_2$ |
| k = 3 | $w_3$ | $w_2$ | $w_3$ | $w_4$ | $w_2$ | $w_4$ | $w_3$ | $w_2$ | $w_3$ | $w_4$ | $w_2$ | $\mathbf{w}_3$ | $w_4$ | $w_2$ | $w_4$ |
| k = 4 | $w_2$ | $w_3$ | $w_4$ | $w_2$ | $w_4$ | $w_3$ | $w_2$ | $w_3$ | $w_4$ | $w_2$ | $\mathbf{w}_3$ | $w_4$ | $w_2$ | $w_4$ | $w_3$ |
| k = 5 | $w_3$ | $w_4$ | $w_2$ | $w_4$ | $w_3$ | $w_2$ | $w_3$ | $w_4$ | $w_2$ | $\mathbf{w}_3$ | $w_4$ | $w_2$ | $w_4$ | $w_3$ | $w_2$ |
| k = 6 | $w_4$ | $w_2$ | $w_4$ | $w_3$ | $w_2$ | $w_3$ | $w_4$ | $w_2$ | $\mathbf{w}_3$ | $w_4$ | $w_2$ | $w_4$ | $w_3$ | $w_2$ | $w_3$ |
| k = 7 | $w_2$ | $w_4$ | $w_3$ | $w_2$ | $w_3$ | $w_4$ | $w_2$ | $\mathbf{w}_3$ | $w_4$ | $w_2$ | $w_4$ | $w_3$ | $w_2$ | $w_3$ | $w_4$ |
| k = 8 | $w_4$ | $w_3$ | $w_2$ | $w_3$ | $w_4$ | $w_2$ | $\mathbf{w}_3$ | $w_4$ | $w_2$ | $w_4$ | $w_3$ | $w_2$ | $w_3$ | $w_4$ | $w_2$ |
| k = 9 | $w_3$ | $w_2$ | $w_3$ | $w_4$ | $w_2$ | $\mathbf{w}_3$ | $w_4$ | $w_2$ | $w_4$ | $w_3$ | $w_2$ | $w_3$ | $w_4$ | $w_2$ | $w_4$ |
| k = 10 | $w_2$ | $w_3$ | $w_4$ | $w_2$ | $\mathbf{w}_3$ | $w_4$ | $w_2$ | $w_4$ | $w_3$ | $w_2$ | $w_3$ | $w_4$ | $w_2$ | $w_4$ | $w_3$ |
| k = 11 | $w_3$ | $w_4$ | $w_2$ | $\mathbf{w}_3$ | $w_4$ | $w_2$ | $w_4$ | $w_3$ | $w_2$ | $w_3$ | $w_4$ | $w_2$ | $w_4$ | $w_3$ | $w_2$ |
| k = 12 | $w_4$ | $w_2$ | $\mathbf{w}_3$ | $w_4$ | $w_2$ | $w_4$ | $w_3$ | $w_2$ | $w_3$ | $w_4$ | $w_2$ | $w_4$ | $w_3$ | $w_2$ | $w_3$ |

TABLE 7-continued

| Slot | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| k = 13 | $w_2$ | **$w_3$** | $w_4$ | $w_2$ | $w_4$ | $w_3$ | $w_2$ | $w_3$ | $w_4$ | $w_2$ | $w_4$ | $w_3$ | $w_2$ | $w_3$ | $w_4$ |
| k = 14 | **$w_3$** | $w_4$ | $w_2$ | $w_4$ | $w_3$ | $w_2$ | $w_3$ | $w_4$ | $w_2$ | $w_4$ | $w_3$ | $w_2$ | $w_3$ | $w_4$ | $w_2$ |

For each value of k the feedback information (in this example $w_3$) that is based on a channel estimation in the first time slot of a CPICH frame is in this case highlighted in bold.

If the composition of the two groups, as shown in FIG. 4, changes from one frame to the next and repeats only in each case from one frame to the next but one, the following distribution of the feedback information relative to the time displacement value k results.

TABLE 8

| Slot | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Uneven-numbered frames | | | | | | | | | | | | | | | |
| k = 0 | $w_3$ | $w_2$ | $w_3$ | $w_4$ | $w_2$ | $w_4$ | $w_3$ | $w_2$ | $w_3$ | $w_4$ | $w_2$ | $w_4$ | $w_3$ | $w_2$ | **$w_3$** |
| k = 1 | $w_2$ | $w_3$ | $w_4$ | $w_2$ | $w_4$ | $w_3$ | $w_2$ | $w_3$ | $w_4$ | $w_2$ | $w_4$ | $w_3$ | $w_2$ | **$w_3$** | $w_4$ |
| k = 2 | $w_3$ | $w_4$ | $w_2$ | $w_4$ | $w_3$ | $w_2$ | $w_3$ | $w_4$ | $w_2$ | $w_4$ | $w_3$ | $w_2$ | **$w_3$** | $w_4$ | $w_2$ |
| k = 3 | $w_4$ | $w_2$ | $w_4$ | $w_3$ | $w_2$ | $w_3$ | $w_4$ | $w_2$ | $w_4$ | $w_3$ | $w_2$ | **$w_3$** | $w_4$ | $w_2$ | $w_4$ |
| k = 4 | $w_2$ | $w_4$ | $w_3$ | $w_2$ | $w_3$ | $w_4$ | $w_2$ | $w_4$ | $w_3$ | $w_2$ | **$w_3$** | $w_4$ | $w_2$ | $w_4$ | $w_3$ |
| k = 5 | $w_4$ | $w_3$ | $w_2$ | $w_3$ | $w_4$ | $w_2$ | $w_4$ | $w_3$ | $w_2$ | **$w_3$** | $w_4$ | $w_2$ | $w_4$ | $w_3$ | $w_2$ |
| k = 6 | $w_3$ | $w_2$ | $w_3$ | $w_4$ | $w_2$ | $w_4$ | $w_3$ | $w_2$ | **$w_3$** | $w_4$ | $w_2$ | $w_4$ | $w_3$ | $w_2$ | $w_3$ |
| k = 7 | $w_2$ | $w_3$ | $w_4$ | $w_2$ | $w_4$ | $w_3$ | $w_2$ | **$w_3$** | $w_4$ | $w_2$ | $w_4$ | $w_3$ | $w_2$ | $w_3$ | $w_4$ |
| k = 8 | $w_3$ | $w_4$ | $w_2$ | $w_4$ | $w_3$ | $w_2$ | **$w_3$** | $w_4$ | $w_2$ | $w_4$ | $w_3$ | $w_2$ | $w_3$ | $w_4$ | $w_2$ |
| k = 9 | $w_4$ | $w_2$ | $w_4$ | $w_3$ | $w_2$ | **$w_3$** | $w_4$ | $w_2$ | $w_4$ | $w_3$ | $w_2$ | $w_3$ | $w_4$ | $w_2$ | $w_4$ |
| k = 10 | $w_2$ | $w_4$ | $w_3$ | $w_2$ | **$w_3$** | $w_4$ | $w_2$ | $w_4$ | $w_3$ | $w_2$ | $w_3$ | $w_4$ | $w_2$ | $w_4$ | $w_3$ |
| k = 11 | $w_4$ | $w_3$ | $w_2$ | **$w_3$** | $w_4$ | $w_2$ | $w_4$ | $w_3$ | $w_2$ | $w_3$ | $w_4$ | $w_2$ | $w_4$ | $w_3$ | $w_2$ |
| k = 12 | $w_3$ | $w_2$ | **$w_3$** | $w_4$ | $w_2$ | $w_4$ | $w_3$ | $w_2$ | $w_3$ | $w_4$ | $w_2$ | $w_4$ | $w_3$ | $w_2$ | $w_3$ |
| k = 13 | $w_2$ | **$w_3$** | $w_4$ | $w_2$ | $w_4$ | $w_3$ | $w_2$ | $w_3$ | $w_4$ | $w_2$ | $w_4$ | $w_3$ | $w_2$ | $w_3$ | $w_4$ |
| k = 14 | **$w_3$** | $w_4$ | $w_2$ | $w_4$ | $w_3$ | $w_2$ | $w_3$ | $w_4$ | $w_2$ | $w_4$ | $w_3$ | $w_2$ | $w_3$ | $w_4$ | $w_2$ |
| Even-numbered frames | | | | | | | | | | | | | | | |
| k = 0 | $w_4$ | $w_2$ | $w_4$ | $w_3$ | $w_2$ | $w_3$ | $w_4$ | $w_2$ | $w_4$ | $w_3$ | $w_2$ | $w_3$ | $w_4$ | $w_2$ | **$w_4$** |
| k = 1 | $w_2$ | $w_4$ | $w_3$ | $w_2$ | $w_3$ | $w_4$ | $w_2$ | $w_4$ | $w_3$ | $w_2$ | $w_3$ | $w_4$ | $w_2$ | **$w_4$** | $w_3$ |
| k = 2 | $w_4$ | $w_3$ | $w_2$ | $w_3$ | $w_4$ | $w_2$ | $w_4$ | $w_3$ | $w_2$ | $w_3$ | $w_4$ | $w_2$ | **$w_4$** | $w_3$ | $w_2$ |
| k = 3 | $w_3$ | $w_2$ | $w_3$ | $w_4$ | $w_2$ | $w_4$ | $w_3$ | $w_2$ | $w_3$ | $w_4$ | $w_2$ | **$w_4$** | $w_3$ | $w_2$ | $w_3$ |
| k = 4 | $w_2$ | $w_3$ | $w_4$ | $w_2$ | $w_4$ | $w_3$ | $w_2$ | $w_3$ | $w_4$ | $w_2$ | **$w_4$** | $w_3$ | $w_2$ | $w_3$ | $w_4$ |
| k = 5 | $w_3$ | $w_4$ | $w_2$ | $w_4$ | $w_3$ | $w_2$ | $w_3$ | $w_4$ | $w_2$ | **$w_4$** | $w_3$ | $w_2$ | $w_3$ | $w_4$ | $w_2$ |
| k = 6 | $w_4$ | $w_2$ | $w_4$ | $w_3$ | $w_2$ | $w_3$ | $w_4$ | $w_2$ | **$w_4$** | $w_3$ | $w_2$ | $w_3$ | $w_4$ | $w_2$ | $w_4$ |
| k = 7 | $w_2$ | $w_4$ | $w_3$ | $w_2$ | $w_3$ | $w_4$ | $w_2$ | **$w_4$** | $w_3$ | $w_2$ | $w_3$ | $w_4$ | $w_2$ | $w_4$ | $w_3$ |
| k = 8 | $w_4$ | $w_3$ | $w_2$ | $w_3$ | $w_4$ | $w_2$ | **$w_4$** | $w_3$ | $w_2$ | $w_3$ | $w_4$ | $w_2$ | $w_4$ | $w_3$ | $w_2$ |
| k = 9 | $w_3$ | $w_2$ | $w_3$ | $w_4$ | $w_2$ | **$w_4$** | $w_3$ | $w_2$ | $w_3$ | $w_4$ | $w_2$ | $w_4$ | $w_3$ | $w_2$ | $w_3$ |
| k = 10 | $w_2$ | $w_3$ | $w_4$ | $w_2$ | **$w_4$** | $w_3$ | $w_2$ | $w_3$ | $w_4$ | $w_2$ | $w_4$ | $w_3$ | $w_2$ | $w_3$ | $w_4$ |
| k = 11 | $w_3$ | $w_4$ | $w_2$ | **$w_4$** | $w_3$ | $w_2$ | $w_3$ | $w_4$ | $w_2$ | $w_4$ | $w_3$ | $w_2$ | $w_3$ | $w_4$ | $w_2$ |
| k = 12 | $w_4$ | $w_2$ | **$w_4$** | $w_3$ | $w_2$ | $w_3$ | $w_4$ | $w_2$ | $w_4$ | $w_3$ | $w_2$ | $w_3$ | $w_4$ | $w_2$ | $w_4$ |
| k = 13 | $w_2$ | **$w_4$** | $w_3$ | $w_2$ | $w_3$ | $w_4$ | $w_2$ | $w_4$ | $w_3$ | $w_2$ | $w_3$ | $w_4$ | $w_2$ | $w_4$ | $w_3$ |
| k = 14 | **$w_4$** | $w_3$ | $w_2$ | $w_3$ | $w_4$ | $w_2$ | $w_4$ | $w_3$ | $w_2$ | $w_3$ | $w_4$ | $w_2$ | $w_4$ | $w_3$ | $w_2$ |

In this case there are a total of six different sequences of feedback information that extend over two frames and with the user station must be able to generate. One of these six possible sequences is shown in italics in Table 8.

EXEMPLARY EMBODIMENT 9

As an alternative to example 8, it can also be provided that the user stations, regardless of the time displacement $\tau_{DPCH}$ assigned to them by the base station BS deliver the feedback information with a fixed sequence, e.g. in accordance with one of Tables 1 to 6. In this case, it is the task of the base station BS to decide for each piece of feedback information supplied by a user station, on the basis of the number of the uplink time slot in which it is received and the stated fixed sequence, the weighting factor to which the feedback information belongs and to update it accordingly.

EXEMPLARY EMBODIMENT 10

In the course of the handover, situations arise with the UMTS system in which a user station MS communicates simultaneously with a number of base stations and receives a global pilot signal CPICH from these. The DPCH frame format permits the transmission of feedback information for only one antenna in each time slot, that is then received by all base stations and evaluated. The global pilot signals of the base stations are therefore to be synchronized to the extent that from the point of view of the user station MS they contain contributions from the same antennas every time. The delay values k or $\tau_{DPCH}$ assigned to a user station by two different base stations are chosen so that the DPCH signals arrive at the user station MS at the same time.

This means that in the case of the exemplary embodiments 3 and 7, time displacements of q-times 3 time slots are permissible between the individual pilot signals CPICH of the base stations, whereby q can be 0, 1, 2, etc. In example 6 the time displacement can be q-times one time slot and for examples 4, 5, 8, 9 it can be q-times 15 or q-times 30 time slots in each case.

Using the pilot bit sequences of an identical antenna, $A_1$, $A_2$, $A_3$ or $A_4$ of different base stations that the user station MS can receive, it determines the channel estimations in each case and transmits feedback information calculated from one of these channel estimations, that is received by all base stations and evaluated.

The invention claimed is:

1. A method for the transmission of a global pilot signal from a base station of a radio communication system to a user station, wherein the base station comprises a plurality of antennas each antenna assigned with a different characteristic pilot bit sequence, and wherein the global pilot signal being generated by overlaying the different pilot bit sequences emitted by multiple antennas of the base station, the method comprising:

a) dividing the plurality of antennas into a first group and a second group, each group including at least two antennas;

b) transmitting an overlayed combination of the different pilot bit sequences corresponding to the antennas of only the first group and not transmitting the pilot bit sequences corresponding to the antennas of the second group;

c) changing the compositions of the first and second group, including moving at least one antenna from the second group into the first group; and d) transmitting an overlayed combination of the different pilot bit sequences corresponding to the antennas of the changed first group and not transmitting the pilot bit sequences corresponding to the antennas of the changed second group, wherein the combination of pilot bit sequences transmitted at step (d) is different than the combination of pilot bit sequences transmitted at step (b).

2. The method in accordance with claim 1, wherein the step of dividing the plurality of antennas are cyclically repeated.

3. The method in accordance with claim 1, wherein the step of dividing comprises providing at least two antennas to the first group.

4. The method in accordance with claim 3, wherein the step of dividing comprises providing at least a third and a fourth antenna each belonging alternately to the first or second group.

5. The method in accordance with claim 1, wherein the step of dividing comprises dividing a third and fourth antenna in at least one of the following manners:

(a) alternate dividing the third and fourth antenna to the second group, (b) dividing the third to the first group and the fourth to the second group, or (c) dividing the third to the second and the fourth to the first group.

6. The method in accordance with claim 1, wherein the step of dividing comprises dividing each antenna of the plurality of antennas to the second group at least once.

7. The method in accordance with claim 1, wherein the step of transmitting is divided into frames, each frame comprising several time slots.

8. The method in accordance with claim 7, wherein step c) is carried out in each case at a boundary between two time slots, at each boundary between two time slots.

9. The method in accordance with claim 7, wherein step of dividing the plurality of antennas are cyclically repeated, and the cycle in which the compositions are repeated is one frame.

10. The method in accordance with claim 9, wherein the transmitted signal is a code-division multiplex signal, that the global pilot signal is emitted continuously, and that step c) is repeated in equal time intervals the duration of which is M/m-times the duration of the frame, with m being a natural number comprising one of 2M, M or 2M/3 and M is the number of time slots in a frame.

11. The method in accordance with claim 1, wherein the user station communicates simultaneously with two or more base stations the compositions of the two groups at the particular base stations are identical.

12. The method in accordance with claim 11, wherein the composition of the first and second groups repeats cyclically with a period t in each case after a whole number 1 of changes and that the frames of the global pilot signal of the particular base stations have a time displacement relative to each other that is a q times the period t, with q being equal to 0, 1, 2, . . . n.

13. An apparatus comprising:

a base station for a mobile radio communication; and a plurality of antennas each configured to transmit a different characteristic pilot bit sequence, wherein the plurality of antennas are divided into at least a first group and a second group, each group comprising at least two antennas, wherein the base station is configured to emit the a first overlayed combination of the different pilot bit sequences from only the first group and not the second group of antennas, and wherein the base station is configured to emit another a second overlayed combination of the different pilot bit sequences from the first group after the compositions of the first and second group is changed wherein the second combination of pilot bit sequences is different than the first combination of pilot bit sequences.

14. The apparatus in accordance with claim 13, wherein the dividing of the plurality of antennas changes periodically.

* * * * *